July 5, 1938.  A. G. LADRACH  2,122,818
PRECISION MEASURING DEVICE
Filed Nov. 5, 1936  2 Sheets-Sheet 1

Inventor
Aaron G. Ladrach

Ralph Barrow
By
Attorney

July 5, 1938.  A. G. LADRACH  2,122,818
PRECISION MEASURING DEVICE
Filed Nov. 5, 1936  2 Sheets—Sheet 2

Inventor
Aaron G. Ladrach
By Ralph Barrow
Attorney

Patented July 5, 1938

2,122,818

UNITED STATES PATENT OFFICE 2,122,818

PRECISION MEASURING DEVICE

Aaron G. Ladrach, Akron, Ohio

Application November 5, 1936, Serial No. 109,323

10 Claims. (Cl. 33—148)

This invention relates to precision measuring devices for use in gauges, weighing scales, and instruments generally wherein it is desired to indicate or record the measurement of movement of a movable element.

The general purpose of the invention is to provide in instruments of this sort a source of light, light-sensitive means affected thereby, means for varying the intensity of the light affecting the light-sensitive means in accordance with variations in the movement of an element, and means for indicating, recording or otherwise manifesting the variation in the light-sensitive means and hence the distance of movement of said element.

The foregoing and other purposes of the invention are attained in the device illustrated in the accompanying drawings and described below. Is is to be understood that the invention is not limited to the specific application or embodiment thereof illustrated and described herein.

Figure 1:
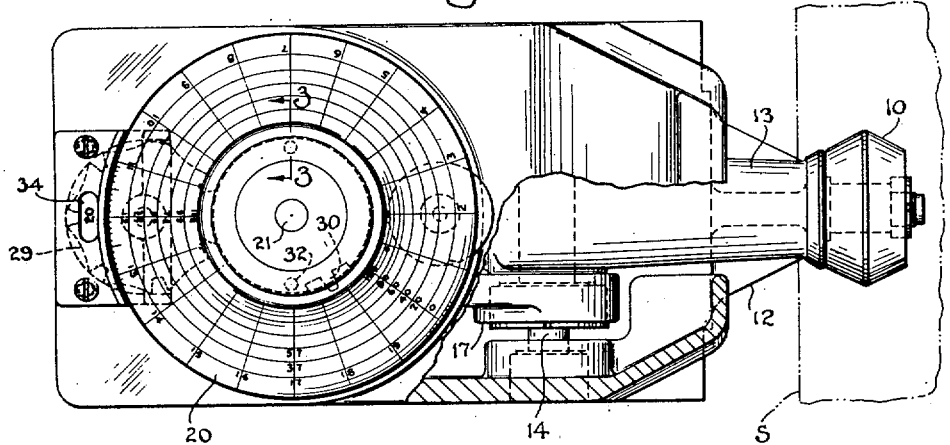
Figure 1 is a plan view partly in section of a continuous gauge embodying the invention.
Figure 2:
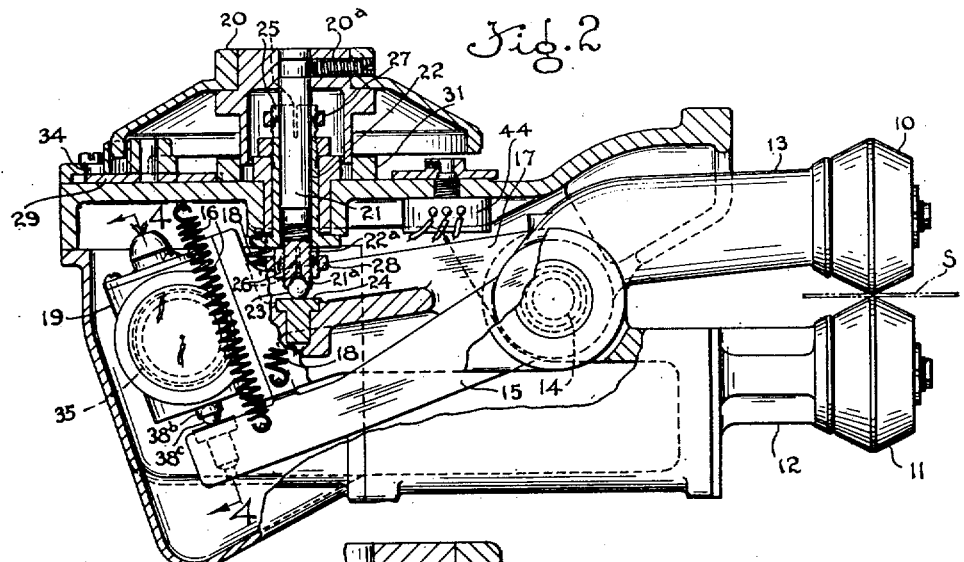
Figure 2 is an elevation, partly in section, of such a gauge.
Figure 3:
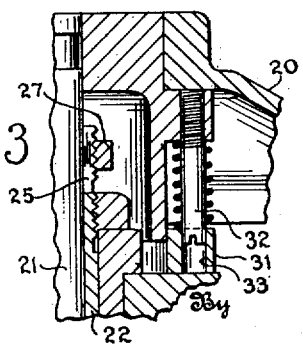
Figure 3 is an enlarged section on line 3—3 of Figure 1.

Referring to the drawings, which for purposes of illustration of one application and embodiment of the invention, there is shown a continuous gauge for measuring sheet material, for example, sheet metal as it issues from a mill, in which gauge there are upper and lower contact rollers 10 and 11 between which passes the sheet stock S. Roller 11 may be mounted upon a relatively fixed arm 12 and roller 10 may be mounted on a movable arm 13 pivoted at 14 and having connected thereto or integral therewith a lever 15, roller 10 being normally urged toward roller 11 by springs 16, 16. A yoke 17 which may be freely pivoted on the pivot pin 14 and which is normally urged upwardly by springs 18, 18 carries the improved measuring unit indicated generally at 19 which unit is adapted to be set in a predetermined gauging or measuring position by means of a suitable setting dial or vernier 20 which may be calibrated as shown to ten-thousandths of an inch, one complete rotation of the dial adjusting the unit 19 a matter of twenty one-thousandths of an inch by suitable means which will be described.

The dial 20 is secured to a shaft 21 as by set screw 20$^a$, the shaft 21 extending through a bushing 22 and being externally threaded at 21$^a$ to engage with internal threads 22$^a$ on the bushing 22 to adjust the shaft vertically. The lower end of the shaft may have a socket with a ball 23 retained therein to engage with a plug 24 on the yoke. The shaft 21 may be tightened so as to turn against friction in the bushing 22 by splitting tapered ends of the bushing as at 25 and 26 and threading into said split ends nuts 27 and 28. The vernier dial is shown as setting unit 19 for gauging at .032 of an inch. To aid in indicating this, a star wheel 29 may be provided to be engaged by a tooth 30 on a member 31 adapted to be rotated about the shaft 21 by pins 32, 32 on the dial member yieldingly urged in sockets 33, 33 in member 31. The star wheel may be marked from 0 to 100 in 20's which markings may appear at an aperture 34 so that the reading at 34 will indicate which reading on the vernier indicates the gauge-setting. At the setting shown the vernier dial numeral "20" at aperture 34 indicates that the vernier setting is between "20" and "40" on the vernier dial and hence the numeral "32" in the radial series on the face or dial of the vernier is the indication between 20 and 40 which gives the vernier setting at .032 inch.

Figure 4:
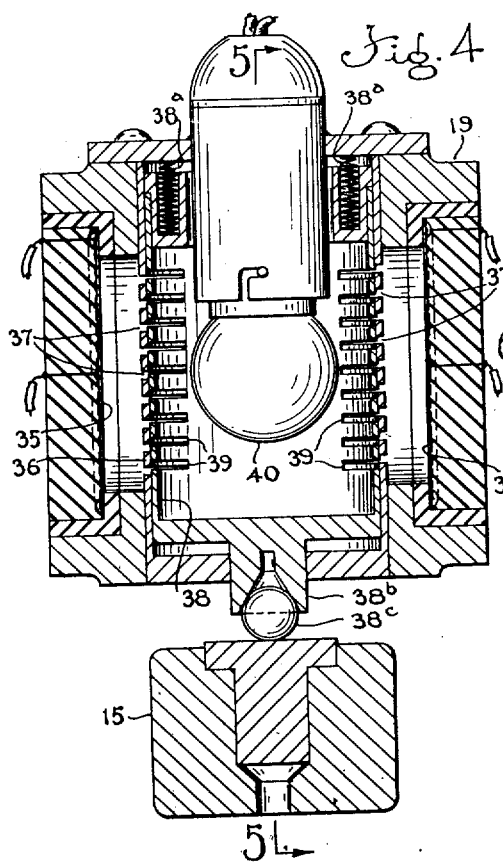
Figure 4 is an enlarged section on line 4—4 of Figure 2.
Figure 5:
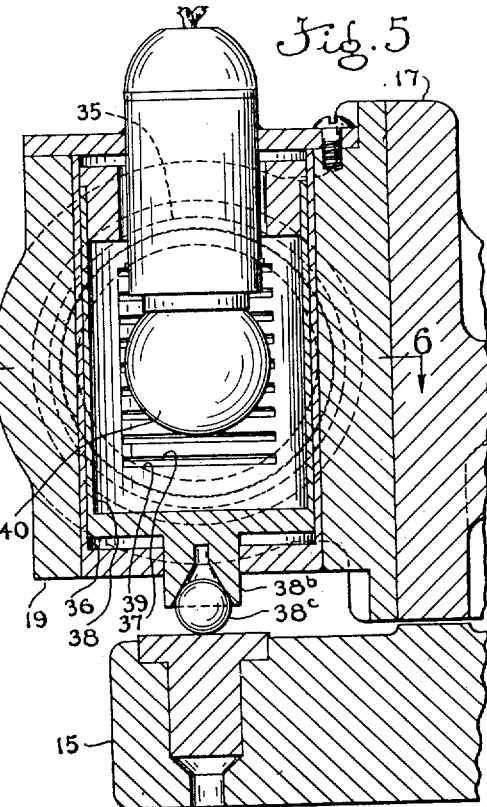
Figure 5 is a section on line 5—5 of Figure 4.
Figure 6:
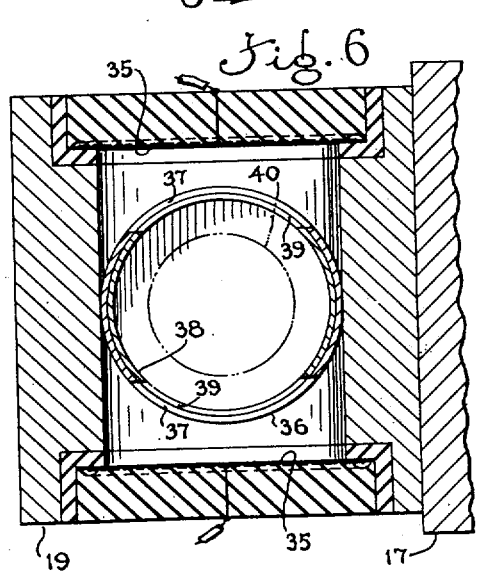
Figure 6 is a section on line 6—6 of Figure 5.

The construction of the measuring unit 19 is best shown in Figures 4 to 6 inclusive. At opposite sides of the inside of measuring unit 19 there are light-sensitive units 35, 35 which may be copper-oxide discs of a known type which are adapted to create an electric potential under the effect of light. Other types of light-sensitive devices either creating or modifying an electric current may be employed. A shutter device is provided for varying the effect of the light for said units. Inwardly of the discs 35 there is supported fixedly in the unit 19 one shutter element comprising a cylinder 36 in which are a series of horizontal slits 37, 37 of equal width and length and equal spacing and an equal number on opposite sides of the cylinder inwardly of the discs 35, the slits on one side being staggered with respect to those on the other. Slidably mounted within cylinder 36 is a second shutter element comprising a cylinder 38 formed with corresponding slits 39 on the opposite sides thereof. The slits in the two cylinders are so arranged that as the inner cylinder 38 moves upwardly slits in the outer cylinder are gradually closed by the inner cylinder at one side (the left in Figure 4) and the slits in the outer cylinder are gradually opened at the other side (the right in Figure 4) and when cylinder 38 moves downwardly in cylinder 36 the slits at one side (the left) open gradually and the slits on the other side (the right) close gradually. A source of light such as an electric lamp 40 is arranged in the two cylinders. The cylinder 38 is normally urged downwardly by springs 38ª, 38ª and its lower end has an extension 38ᵇ provided with a socket with a ball 38ᶜ retained therein, the latter being engaged with a plug in the lever 15.

Figure 7:
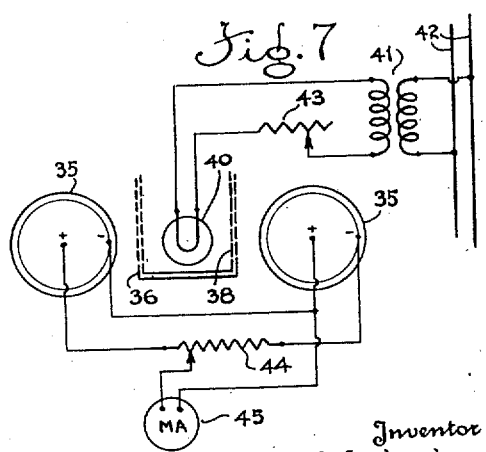
Figure 7 is a diagrammatic view illustrating the electrical connections to the device.

As best shown in Figure 7 the light source 40 may be supplied with electricity from a suitable source such as through a transformer 41 from power lines 42, a variable resistance at 43 being provided to adjust light 40 to any desired intensity. The sensitive units 35, 35 are connected in a Wheatstone bridge as shown through a suitable potentiometer 44 to a suitable galvanometer such as a milliammeter 45 which may be calibrated to distances on either side of a zero position, showing variations in distance from either side of the gauge setting.

In use, the vernier is first set to the gauge desired for the material S, the vernier correspondingly locating in a fixed position the cylinder 36 and the light-sensitive units 35. The light source 40 is adjusted to the operating intensity required. And when material of the correct gauge is passed between rollers 10 and 11, the slits in cylinders 36 and 38 are so placed relatively that equal openings for passage of light are provided at both sides of the cylinders. This has corresponding effects upon the light-sensitive units, balancing or equalizing the potentials developed therein by the light. Any unbalance by reason of differences in the sensitive units or in the intensity of the light as it emanates from the opposite sides of the source may be equalized by the potentiometer 44 causing the milliammeter 45 to indicate zero on its scale.

If now the material S as it issues from the mill varies from the correct gauge this will cause arm 13 to move up or down against or under the action of the springs 16 and will consequently cause lever 15 to move down or up which in turn causes cylinder 38 to move down or up in cylinder 36. Such movement tends to close the slits at one side and to open the slits at the other side of the light source and vice versa, and this amplifies the movement by allowing less light to reach one unit 35 and more to reach the other in either case thereby throwing the Wheatstone bridge out of balance due to the difference in potential set up between the light sensitive units, and causing the deflection of the milliammeter indicator an amount proportional to the variations in light intensity. This deflection can be utilized to indicate, record or otherwise manifest the thickness variation as will be understood by skilled artisans.

It will be obvious that a measure of the benefits of the invention may be procured by utilizing a single light sensitive element, with a single means for varying the light intensity in accordance with movement of an element and measuring the changes in potential or current thus produced by the light sensitive element. The herein described arrangement is preferred because it amplifies the change and has a tendency to balance out errors or to render such errors negligible whereby the instrument is reasonably accurate to .0001 inch.

Modifications of the invention may be resorted to without departing from the spirit thereof or the scope of the appended claims.

What is claimed is:

1. An instrument for measuring various distances comprising a movable distance-gauging element and means for manifesting movement thereof, said means comprising a source of light, two light-sensitive units affected thereby, means for varying the intensity of light affecting said units with movement of the element to different gauging positions to increase the intensity affecting one and decrease the intensity affecting the other, and means for manifesting the differential of potential set up between the two units thereby to manifest various relative positions of said distance-gauging element.

2. An instrument for measuring various distances comprising a movable distance-gauging element and means for manifesting movement thereof, said means comprising a source of light, two light-sensitive units affected thereby, means for varying the intensity of light affecting said units with movement of the element to various distance-gauging positions to increase the intensity affecting one and decrease the intensity affecting the other, and means for manifesting the differential of potential set up between the two units thereby to manifest various distances, said intensity varying means comprising a shutter device including two sets of shutters, one for varying the light intensity on one unit and one for varying the light intensity on the other unit, and operable in unison in accordance with movement of said element one to increase and one to decrease the light intensity.

3. An instrument for measuring variable distances comprising a movable element responsive to distance variations by contact with material to be measured and means for manifesting movement of said element, said means comprising a source of light, a light sensitive unit affected thereby, said light source and said unit being relatively fixed, said light source providing a relatively fixed beam of light to affect said light sensitive unit, means comprising a shutter device including substantially juxtaposed relatively movable elements arranged between the light source and the light sensitive unit for varying the intensity of the light affecting said unit, said means being controlled by movement of said element, in accordance with distance variations, and means for manifesting variations of an electrical potential produced by said unit to manifest said distance variations.

4. An instrument for measuring various distances comprising a movable element for contacting material to be measured and means for manifesting movement of said element, said means comprising a source of light, a light sensitive unit affected thereby, said light source and said unit being relatively fixed, said light source providing a relatively fixed beam of light to affect said light sensitive unit, means comprising a shutter device including substantially juxtaposed relatively movable elements arranged between the light source and the light sensitive unit for varying the intensity of the light affecting said unit, said means being controlled by movement of said element in accordance with distance variations, and means for manifesting variations of an electrical potential produced by said unit, said intensity varying means comprising relatively movable shutter elements between the light source and the light sensitive unit and operatively connected to said movable element for relative movement thereof to permit more or less light to affect said light sensitive unit in accordance with movement of said element to manifest various distances.

5. An instrument for measuring various distances comprising a source of light, a light sensitive unit, said light source and said unit being relatively fixed, said light source providing a relatively fixed beam of light to affect said light sensitive unit, a shutter device comprising substantially juxtaposed relatively movable elements between the light source and the light sensitive unit adapted to vary the intensity of the light affecting said unit in accordance with relative movement of said elements, movable gauging means for relatively moving said elements, and means for manifesting an electrical potential developed in said unit under the effect of light to manifest various distances gauged by said gauging means.

6. An instrument for measuring various distances comprising a source of light, a light sensitive unit, said light source and said unit being relatively fixed, said light source providing a relatively fixed beam of light to affect said light sensitive unit, a shutter device comprising substantially juxtaposed relatively movable elements between the light source and the light sensitive unit adapted to vary the intensity of the light affecting said unit in accordance with relative movement of said elements, movable gauging means for relatively moving said elements, and means for manifesting an electrical potential developed in said unit under the effect of light to manifest various distances gauged by said gauging means, said relatively movable elements comprising shutters arranged between the light source and the light sensitive unit.

7. An instrument for measuring distances comprising a source of light, a light sensitive unit affected thereby, said light source and said unit being relatively fixed, said light source providing a relatively fixed beam of light to affect said light sensitive unit, movable means comprising a shutter device including relatively movable substantially juxtaposed elements between the light source and the unit for varying the intensity of the light affecting said unit, a movable gauging element for moving said means, and means connected to said sensitive unit to manifest various distances by variations in said unit.

8. An instrument for measuring distances comprising a source of light, a light sensitive unit affected thereby, said light source and said unit being relatively fixed, said light source providing a relatively fixed beam of light to affect said light sensitive unit, movable means comprising a shutter device including relatively movable substantially juxtaposed elements between the light source and the unit for varying the intensity of the light affecting said unit, a movable gauging element for moving said means, and means connected to said sensitive unit to manifest various distances by variations in said unit, said means comprising relatively movable shutter elements between the light source and said unit.

9. A distance-gauging instrument comprising a source of light, a light sensitive unit affected thereby, said light source and said unit being relatively fixed, said light source providing a relatively fixed beam of light to affect said light sensitive unit, and means for varying the intensity of the light affecting said unit, said means comprising relatively movable substantially juxtaposed shutter elements betwen the light source and said unit, gauging means for relatively moving said shutter elements and means for adjusting one set of said shutter elements to a predetermined measuring position to and from which the other shutter element may be relatively moved to vary the intensity of the light passing said shutter elements and means for manifesting distances gauged by said gauging means by manifesting variations in said sensitive unit.

10. An instrument for measuring variable distances comprising a movable gauging member, a shutter device comprising relatively movable substantially juxtaposed shutter elements, said movable gauging member being operatively connected to said shutter device to actuate the same, a light source on one side of said shutter device, a light sensitive unit on the other side of the shutter device, and means for manifesting variations in electrical potential in said light sensitive unit.

AARON G. LADRACH.

DISCLAIMER 2,122,818.—*Aaron G. Ladrach*, Akron, Ohio. PRECISION MEASURING DEVICE. Patent dated July 5, 1938. Disclaimer filed April 15, 1940, by the assignee, *Illinois Tool Works*.

Hereby enters this disclaimer to claims 3, 4, 5, 6, 7, 8, 9, and 10 in said specification.

[*Official Gazette May 7, 1940.*]

tively movable shutter elements between the light source and the light sensitive unit and operatively connected to said movable element for relative movement thereof to permit more or less light to affect said light sensitive unit in accordance with movement of said element to manifest various distances.

5. An instrument for measuring various distances comprising a source of light, a light sensitive unit, said light source and said unit being relatively fixed, said light source providing a relatively fixed beam of light to affect said light sensitive unit, a shutter device comprising substantially juxtaposed relatively movable elements between the light source and the light sensitive unit adapted to vary the intensity of the light affecting said unit in accordance with relative movement of said elements, movable gauging means for relatively moving said elements, and means for manifesting an electrical potential developed in said unit under the effect of light to manifest various distances gauged by said gauging means.

6. An instrument for measuring various distances comprising a source of light, a light sensitive unit, said light source and said unit being relatively fixed, said light source providing a relatively fixed beam of light to affect said light sensitive unit, a shutter device comprising substantially juxtaposed relatively movable elements between the light source and the light sensitive unit adapted to vary the intensity of the light affecting said unit in accordance with relative movement of said elements, movable gauging means for relatively moving said elements, and means for manifesting an electrical potential developed in said unit under the effect of light to manifest various distances gauged by said gauging means, said relatively movable elements comprising shutters arranged between the light source and the light sensitive unit.

7. An instrument for measuring distances comprising a source of light, a light sensitive unit affected thereby, said light source and said unit being relatively fixed, said light source providing a relatively fixed beam of light to affect said light sensitive unit, movable means comprising a shutter device including relatively movable substantially juxtaposed elements between the light source and the unit for varying the intensity of the light affecting said unit, a movable gauging element for moving said means, and means connected to said sensitive unit to manifest various distances by variations in said unit.

8. An instrument for measuring distances comprising a source of light, a light sensitive unit affected thereby, said light source and said unit being relatively fixed, said light source providing a relatively fixed beam of light to affect said light sensitive unit, movable means comprising a shutter device including relatively movable substantially juxtaposed elements between the light source and the unit for varying the intensity of the light affecting said unit, a movable gauging element for moving said means, and means connected to said sensitive unit to manifest various distances by variations in said unit, said means comprising relatively movable shutter elements between the light source and said unit.

9. A distance-gauging instrument comprising a source of light, a light sensitive unit affected thereby, said light source and said unit being relatively fixed, said light source providing a relatively fixed beam of light to affect said light sensitive unit, and means for varying the intensity of the light affecting said unit, said means comprising relatively movable substantially juxtaposed shutter elements betwen the light source and said unit, gauging means for relatively moving said shutter elements and means for adjusting one set of said shutter elements to a predetermined measuring position to and from which the other shutter element may be relatively moved to vary the intensity of the light passing said shutter elements and means for manifesting distances gauged by said gauging means by manifesting variations in said sensitive unit.

10. An instrument for measuring variable distances comprising a movable gauging member, a shutter device comprising relatively movable substantially juxtaposed shutter elements, said movable gauging member being operatively connected to said shutter device to actuate the same, a light source on one side of said shutter device, a light sensitive unit on the other side of the shutter device, and means for manifesting variations in electrical potential in said light sensitive unit.

AARON G. LADRACH.

DISCLAIMER 2,122,818.—*Aaron G. Ladrach*, Akron, Ohio. PRECISION MEASURING DEVICE. Patent dated July 5, 1938. Disclaimer filed April 15, 1940, by the assignee, *Illinois Tool Works*.

Hereby enters this disclaimer to claims 3, 4, 5, 6, 7, 8, 9, and 10 in said specification.

[*Official Gazette May 7, 1940.*]

DISCLAIMER 2,122,818.—*Aaron G. Ladrach*, Akron, Ohio. PRECISION MEASURING DEVICE. Patent dated July 5, 1938. Disclaimer filed April 15, 1940, by the assignee, *Illinois Tool Works*.

Hereby enters this disclaimer to claims 3, 4, 5, 6, 7, 8, 9, and 10 in said specification.

[*Official Gazette May 7, 1940.*]